United States Patent Office 3,544,664
Patented Dec. 1, 1970

---

3,544,664
BIS CYANOALKYL AMIDE PHOSPHATES AND PHOSPHONATES
Peter E. Newallis, Overland Park, Kans., and Pasquale Lombardo, Laurel, Md., assignors to Allied Chemical Corporation, New York, N.Y., a corporation of New York
No Drawing. Filed Jan. 19, 1968, Ser. No. 699,018
Int. Cl. C07f 9/16, 9/40; A01n 9/36
U.S. Cl. 260—940
9 Claims

ABSTRACT OF THE DISCLOSURE

Bis cyanoalkyl amide phosphates and phosphonates useful as insecticides having the following general formula:

$$R-\overset{X}{\underset{R_1}{\overset{\|}{P}}}-S-CH_2\overset{O}{\overset{\|}{C}}-N[\overset{R_2}{\underset{}{C}H}-CN]_2$$

wherein X represents oxygen or sulfur; R represents an alkoxyl group having 1–5 carbon atoms; $R_1$ represents an alkyl or alkoxyl group having 1–5 carbon atoms; and $R_2$ represents hydrogen or an alkyl group having 1–5 carbon atoms.

The above compounds are prepared by reacting ammonium salts of phosphoric acid monoesters or diesters with a chloro-N,N-dicyanoalkyl amide.

BACKGROUND OF THE INVENTION

This invention relates to a new class of phosphates useful as insecticides and in particular to a new class of N-N disubstituted dicyanoalkyl amides.

The requirements for useful insecticides and acaricides vary depending upon the kind of application intended. To be successful, an insecticide and acaricide must be toxic to the insect or acarid to be controlled. For some applications, it is desirable that the insecticide be stable and have extended residual activity; for other applications, it is desirable that its useful life be short. For use by unskilled personnel, it should be relatively nontoxic to mammals; in other cases, particularly where it is to be applied only by skilled personnel, the mammalian toxicity is less of a factor. Of course, where the insecticide or acaricide is to be applied to the foliage or roots of plants, or to soil in which the plant is growing, it must be nonphytotoxic, at least at the insecticidal or acaricidal dosage.

It is an object of the present invention to provide a new class of phosphates useful as insecticides and acaricides.

It is an additional object of the present invention to provide a new class of N-N disubstituted dicyanoalkyl amides useful as insecticides and acaricides.

It is a further object of the present invention to provide a process for producing a new class of N–N disubstituted dicyanoalkyl amides useful as insecticides and acaricides.

SUMMARY OF THE INVENTION

This following general structure represents the compounds of the invention:

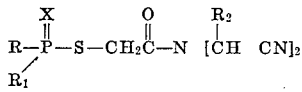

wherein X represents oxygen or sulfur, R represents an alkoxyl group having 1–5 carbon atoms, $R_1$ represents an alkyl or alkoxyl group having 1–5 carbon atoms, and $R_2$ represents hydrogen or an alkyl group having 1–5 carbon atoms.

These compounds are viscous liquids which are soluble in many organic solvents but are essentially insoluble in water. They have an outstanding acaricidal activity, and are characterized by low toxicity toward warm-blooded animals. Accordingly, they can be used safely and very effectively for combatting egg and active stages of spider mites in the protection of plants. These compounds can also be used as active toxicants in compositions for the control of a number of insect organism such as flies, beetles, worms, roaches, cattle grubs and aphids. Furthermore, the toxic potency of this class of compounds is such so as to permit their effective use as dilute solutions in soaps, sprays, paints and oils.

DESCRIPTION OF THE PREFERRED EMBODIMENT

The synthesis of this class of compounds of the present invention may be carried out by reacting N-N disubstituted dicyanoalkyl amides with the ammonium salt of a monoester or diester of phosphoric acid as illustrated by the following reaction:

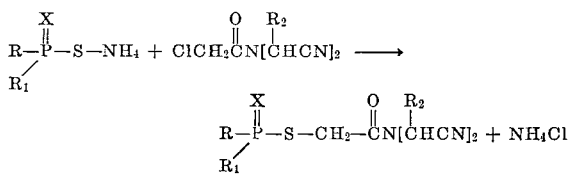

wherein R, $R_1$, $R_2$, and X have the same significance as indicated above. The reaction may be carried out in any common inert organic solvent such as acetone, benzene, dimethylformamide or carbon tetrachloride. Approximate stoichiometric amounts of the reactants are used.

The mixture is agitated generally for 12–36 hours and preferably for 18–30 hours at ambient temperatures generally ranging from 15°–35° C. and preferably at 20°–25° C. The reaction is carried out at atmospheric pressure although higher pressures can be used. After the reaction is completed, the solvent is removed by distillation in vacuo and the residue is dissolved in an organic solvent such as methylene chloride. The organic solution is then washed several times with water and dried over a drying agent, such as anhydrous magnesium sulfate. The organic solvent is removed under reduced pressure thereby providing a viscous oil residue.

Preparation of typical compounds of the invention are described in the following example. The example is intended to be illustrative and exemplary in character, only, and is not to be considered as limiting the invention in any way. The reaction conditions can also be modified without departing from the spirit of this invention.

EXAMPLE I

A solution of 2 grams of chloro-N,N-dicyanomethyl acetamide in 50 ml. of acetone was added to a solution of 3 grams (25% in excess of the stoichiometric amount) of the ammonium salt of O, O-diethyl phosphorodithioic acid in 50 ml. of acetone. Precipitation of ammonium chloride was rapid. The reaction mixture was stirred at room temperature for 24 hours. At the end of that period, the acetone was removed in vacuo, and the residue was taken up in 50 ml. of methylene chloride. The organic solution was washed three times with 25 ml. portions of water, and then dried over anhydrous magnesium sulfate. The methylene chloride was removed in vacuo to leave 3.5 grams of diethoxyphosphinothioylthio-N,N-dicyanomethyl acetamide in the form of a viscous amber oil.

Table I sets forth typical examples of compounds including the compound of Example I (listed as Compound 1) which were prepared by the same process as that used in Example I.

TABLE I

| Compound No. | Compound | Analysis, percent | | | |
|---|---|---|---|---|---|
| | | Calculated | | Found | |
| | | C | H | C | H |
| 1 | $(C_2H_5O)_2\overset{S}{\overset{\|}{P}}S-CH_2\overset{O}{\overset{\|}{C}}N(CH_2CN)_2$ | 37.4 | 5.02 | 37.0 | 5.3 |
| 2 | $(C_2H_5O)_2\overset{O}{\overset{\|}{P}}S-CH_2\overset{O}{\overset{\|}{C}}N(CH_2CN)_2$ | 39.4 | 5.22 | 40.0 | 5.8 |
| 3 | $(CH_3O)_2\overset{S}{\overset{\|}{P}}S-CH_2\overset{O}{\overset{\|}{C}}N(CH_2CN)_2$ | 32.7 | 4.09 | 30.8 | 4.5 |
| 4 | $\begin{array}{c}C_2H_5O\\ \diagdown\\ CH_3\diagup\end{array}\overset{S}{\overset{\|}{P}}S-CH_2\overset{O}{\overset{\|}{C}}N(CH_2CN)_2$ | 39.1 | 4.8 | 37.4 | 5.3 |
| 5 | $(C_2H_5O)_2\overset{S}{\overset{\|}{P}}S-CH_2\overset{O}{\overset{\|}{C}}N(\overset{CH_3}{\overset{\|}{C}H}CN)_2$ | 41.2 | 5.74 | 40.7 | 6.0 |
| 6 | $(C_2H_5O)_2\overset{O}{\overset{\|}{P}}S-CH_2\overset{O}{\overset{\|}{C}}N(\overset{CH_3}{\overset{\|}{C}H_2}CN)_2$ | 43.0 | 6.0 | 43.0 | 6.4 |
| 7 | $(CH_3O)_2\overset{S}{\overset{\|}{P}}S-CH_2\overset{O}{\overset{\|}{C}}N(\overset{CH_3}{\overset{\|}{C}H_2}CN)_2$ | 37.4 | 4.98 | 38.3 | 5.48 |
| 8 | $\begin{array}{c}C_2H_5O\\ \diagdown\\ CH_3\diagup\end{array}\overset{S}{\overset{\|}{P}}S-CH_2\overset{O}{\overset{\|}{C}}N(\overset{CH_3}{\overset{\|}{C}H_2}CN)_2$ | 41.4 | 5.66 | 40.1 | 6.04 |

In using the compounds of this invention as insecticides and acaricides the undesirable organism may be killed by contacting the insect directly, by contacting the insect through its habitat, or by contacting the insect through its food prior to ingestion and after ingestion with toxic amounts of the compounds. Standardized tests both systemic and non-systemic were conducted to determine the effectiveness as insecticides and acaricides of the compounds listed in Table I against adult house flies (HFA), Mexican bean beetle larvae (MBBL), southern armyworm larvae (SAL), pea aphid adults (PAA), and two-spotted spider mites (TSSM).

The following non-systemic tests were performed to illustrate the use of the compounds of Table I in controlling insects and acarids.

TEST I

Non-systemic primary test for Mexican bean beetle larvae (MBBL)

A solution consisting of 4.8 gm. of Compound 1 was mixed in 100 cc. of acetone. The solution was diluted with water so that the concentration of Compound 1 was 1 oz./100 gal.

Horticultural (cranberry) bean plants, in 2½ inch pots with all foliage removed except one primary leaf, were sprayed with the solution for 2 seconds on the upper surface and 5 seconds on the under surface. The spray was delivered from a DeVilbiss atomizer nozzle at 20 p.s.i. The approximate volume of spray on the upper surface was 0.19 cc. and the under surface was 0.48 cc. After spraying, the deposits were allowed to dry on the plants and 5 3rd instar larvae were then confined on each plant with 6 inch screen wire spheres. Mortality and feeding records were made 3 days after treatment.

TEST II

Non-systemic test for pea aphid adults (PAA)

A solution consisting of 4.8 grams of Compound 1 was mixed in 100 cc. of acetone. The solution was divided and then diluted with water so that two solutions were formed having a concentration of Compound 1 of ¼ oz./100 gal. and ⅛ oz./100 gal.

English broad bean plants were sprayed repeatedly with each solution for 2 seconds on the upper surface and 5 seconds on under surface with this solution. Adult female aphids (10 per test) were brushed from infested broad bean plants into 5 inch screen wire hemispheres and sprayed for 5 seconds (approx. 0.6 cc. delivery per second from nozzle). Spray was applied from a DeVilbiss atomizer nozzle at 20 p.s.i., with the aphids 15 inches from nozzle. Following treatment, aphids were caged over previously sprayed plants and mortality records were usually made 3 days later.

TEST III

Non-systemic primary test for southern armyworm larvae (SAL)

A solution consisting of 4.8 gms. of Compound 1 was mixed in 100 cc. of acetone. The solution was diluted with water so that the concentration of Compound 1 was 4 oz./100 gal.

Horticultural (cranberry) bean plants, in 2½ inch pots with all foliage removed except one primary leaf, were sprayed with the solution for 2 seconds on the upper surface and 5 seconds on the under surface. The spray was delivered from a DeVilbiss atomizer nozzle at 20 p.s.i. The approximate volume of spray on the upper surface was 0.19 cc. and the under surface was 0.48 cc. After spraying, the deposits were allowed to dry on the plants and 5 4th and 5th instar larvae were then confined on each plant with 6 inch screen wire spheres. Mortality and feeding records were made 3 days after treatment.

TEST IV

Non-systemic primary test for two-spotted spider mites (TSSM)

A solution was prepared of 4.8 gm. of Compound 1 in 100 cc. of acetone. The solution was divided into five separate solutions and each solution was diluted with water to provide five solutions in which the concentration of Compound 1 was 8 oz./100 gal., 1 oz./100 gal., ½ oz./100 gal., ¼ oz./100 gal., and ⅛ oz./100 gal.

Young horticultural (cranberry) bean plants in 2½ inch pots were infested with mites (all stages) one day before treatment. In treating plants the upper surface was sprayed with the solution for two seconds and the lower or under surface was sprayed for 5 seconds. The spray was delivered from a DeVilbiss atomizer nozzle operated at 20 p.s.i. with the plant about 18″ from nozzle. The approximate volume of spray on the upper surface was 0.13 cc. and on the lower surface was 0.32 cc. Following the treatment, the potted plants were placed in irrigated trays in the greenhouse and initial kills of adults were recorded three days later. Residual and ovicidal observations were made 7–8 days after treatment, which allowed ample time for the eggs to hatch under greenhouse conditions. One leaf from each plant was used to make 3-day counts, and the remaining leaf on each plant was used to determine residual and ovicidal activity.

TEST V

Non-systemic primary test for house fly adults (HFA)

Three portions of dry food (6 parts powdered nonfat dry milk, 6 parts granulated sugar and 1 part powdered egg) were mixed with an acetone solution of Compound 1 so that the three portions of food contained 0.125%, 0.0625% and 0.0313% of the compound. The mixtures were allowed to dry and then repulverized. The treated food was placed in emergence cages containing 50 fly pupae. Cages containing untreated food were used as checks. Examination of each cage was made periodically for 10 days to determine emergence, condition of flies, and acute toxicity.

The results of these non-systemic tests are listed in Table II.

TABLE II

[Results of Non-Systemic Primary Tests]

| Compound No. | Percent Mortality | | | | |
| --- | --- | --- | --- | --- | --- |
| | MBBL, Test I | PAA, Test II | SAL, Test III | TSSM, Test IV | HFA, Test V |
| 1 | [1] 0 | [2] 90 | [3] 0 | [4] 100 | [5] 100 |
| | | [6] 0 | | [7] 100 | [8] 97.8 |
| | | | | [9] 94.2 | [10] 100 |
| | | | | [2] 53.5 | |
| | | | | [6] 20.7 | |

[1] 1 oz./100 gal.
[2] ¼ oz./100 gal.
[3] 4 oz./100 gal.
[4] 8 oz./100 gal.
[5] 0.125% in dry bait, 8-day kill.
[6] ⅛ oz./100 gal.
[7] 1 oz./100 gal., fair residual.
[8] 0.625% in dry bait, 8-day kill.
[9] ½ oz./100 gal.
[10] 0.0313% in dry bait, 7–10 day kill.

Compound 1 was then put through systemic primary and secondary tests. The systemic primary tests were conducted for MBBL, PAA, SAL, and TSSM. The systemic secondary tests were conducted for MBBL and PAA.

TEST VI

Systemic primary test for Mexican bean beetle larvae (MBBL)

A standard acetone solution containing 4.8 grams of Compound 1 per 100 cc. of acetone was diluted with water to 4 oz./100 gals. of H₂O. After dilution, 100 cc. of the solution was placed in glass jars, along with the test plants (young horticultural (cranberry) bean plants) whose roots had been washed free of soil. The roots of the test plants were in contact with the bottom of the container. Aluminum foil was fitted over the top of the container and around the stem of the plant to lessen possible fumigant effects of the compounds tested. The insects were placed on the plants within 24 hours after treatment and the mortality records were made 3 days later.

TEST VII

Systemic primary test for pea aphid adults (PAA)

A standard acetone solution containing 4.8 grams of Compound 1 per 100 cc. of acetone was diluted with water to 4 oz./100 gals. H₂O. After dilution, 100 cc. of the solution was placed in glass jars, along with the test plants (young English broad bean plants) whose roots had been washed free of soil. The roots of the test plants were in contact with the bottom of the container. Aluminum foil was fitted over the top of the container and around the stem of the plant to lessen possible fumigant effects of the compounds tested. The insects were placed on the plants within 24 hours after treatment and the mortality records were made 3 days later.

TEST VIII

Systemic primary test for southern armyworm larvae (SAL)

A standard acetone solution containing 4.8 grams of Compound 1 per 100 cc. of acetone was diluted with water to 4 oz./100 gals. of H₂O. After dilution, 100 cc. of the solution was placed in glass jars, along with the test plants (young horticultural (cranberry) bean plants) whose roots had been washed free of soil. The roots of the test plants were in contact with the bottom of the container. Aluminum foil was fitted over the top of the container and around the stem of the plant to lessen possible fumigant effects of the compounds tested. The insects were placed on the plants within 24 hours after treatment and the mortality records were made 3 days later.

TEST IX

Systemic primary test for two-spotted spider mites (TSSM)

A standard acetone solution containing 4.8 grams of Compound 1 per 100 cc. of acetone was diluted with water to 4 oz./100 gals of H₂O. After dilution, 100 cc. of the solution was placed in glass jars, along with the test plants (young horticultural (cranberry) bean plants) whose roots had been washed free of soil. The roots of the test plants were in contact with the bottom of the container and around the stem of the plant to lessen possible fumigant effects of the compounds tested. The inserts were placed on the plants within 24 hours after treatment and the mortality records were made 3 days later. The ovicidal and residual data was recorded 8 days after the treatment.

TEST X

Systemic secondary test for Mexican bean beetle larvae (MBBL) whole plant—stem treatment A standard acetone solution containing 4.8 grams of Compound 1 per 100 cc. of acetone was pipetted on plant stems about 1 inch above soil level. There was deposited 0.01 cc. per plant stem or 0.78 mg. of Compound 1 per plant stem using a capillary pipette graduated in 0.001 cc. Young horticultural (cranberry) bean plants were used in the test. The Mexican bean beetles larvae were placed on plants one day after treatment with the solution and mortality records were usually made 3 days later.

TEST XI

Systemic secondary test for pea aphid adults (PAA) whole plant—stem treatment

A standard acetone solution containing 4.8 grams of Compound 1 per 100 cc. of acetone was pipetted on plant stems about 1 inch above soil level. There was deposited 0.01 cc. per plant stem or 0.78 mg. of Compound 1 per plant stem using a capillary pipette graduated in 0.001 cc. Young English broad bean plants were used in the test. The pea aphid adults were placed on plants one day after treatment with the solution and mortality records were usually made 3 days later.

The results of Tests VI–XI for Compound 1 are listed in Table III.

TABLE III.—RESULTS OF SYSTEMIC PRIMARY TESTS

Used in dil. of 4 oz./100 gals. H₂O

| Compound No. 1: | Percent mortality |
|---|---|
| MBBL, Test VI | 20 |
| PAA, Test VII | 100* |
| SAL, Test VIII | 50 |
| TSSM, Test IX | 100 |

*No live young on test plants.

RESULTS OF SYSTEMIC SECONDARY TESTS—WHOLE PLANT, STEM TREATMENT

| Compound No. 1: | Percent mortality |
|---|---|
| MBBL, Test X | 0 |
| PAA, Test XI | 100 |

As can be seen from the results listed in Tables II and III, the compounds of the present invention were very effective in controlling pea aphid adults, two-spotted, spider mites, and house flies.

The illustrations of the compounds of the present invention given above are not intended to limit the invention in any way, but are merely descriptive. All modifications of the compounds of the present invention which fall within the spirit of the present invention are claimed as part of the present invention.

We claim:
1. A compound of the formula:

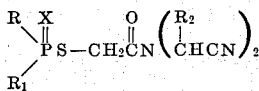

wherein
X represents oxygen or sulfur;
R represents an alkoxyl group having 1–5 carbon atoms:
R₁=alkyl or alkoxyl group having 1–5 carbon atoms; and
R₂ represents hydrogen or an alkyl group having 1–5 carbon atoms.

2. A compound of the formula of claim 1 in which X represents sulfur, R represents an ethoxy group, and R₁ represents an ethoxy group.

3. A compound of the formula of claim 1 in which X represents oxygen, R represents an ethoxy group, and R₁ represents an ethoxy group.

4. A compound of the formula of claim 1 in which R represents a methoxy group, and R₁ represents a methoxy group.

5. A compound of the formula of claim 1 in which R represents an ethoxy group, and R₁ represents a methyl group.

6. A compound of claim 1 having the formula:

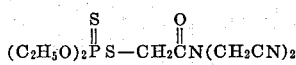

7. A compound of claim 1 having the formula:

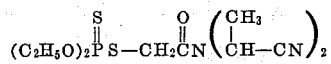

8. A compound of claim 1 having the formula:

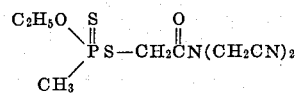

9. A compound of claim 1 having the formula:

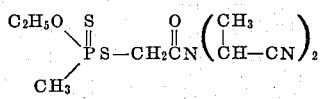

References Cited

UNITED STATES PATENTS 3,033,744   5/1962   Losco et al. _____ 260—940X

CHARLES B. PARKER, Primary Examiner

A. H. SUTTO, Assistant Examiner

U.S. Cl. X.R.

260—978; 424—210